United States Patent
Lee et al.

(10) Patent No.: US 12,141,521 B2
(45) Date of Patent: Nov. 12, 2024

(54) METHOD FOR EDITING TEXT INFORMATION

(71) Applicant: ActionPower Corp., Seoul (KR)

(72) Inventors: Jihwa Lee, Seoul (KR); Jaeyup Song, Seoul (KR)

(73) Assignee: ActionPower Corp., Seoul (KR)

( * ) Notice: Subject to any disclaimer, the term of this patent is extended or adjusted under 35 U.S.C. 154(b) by 0 days.

(21) Appl. No.: 18/632,825

(22) Filed: Apr. 11, 2024

(65) Prior Publication Data

US 2024/0346236 A1   Oct. 17, 2024

(30) Foreign Application Priority Data

Apr. 12, 2023 (KR) ......................... 10-2023-0048030

(51) Int. Cl.
*G06F 40/10* (2020.01)
*G06F 40/166* (2020.01)

(52) U.S. Cl.
CPC ............ *G06F 40/166* (2020.01); *G06F 40/10* (2020.01)

(58) Field of Classification Search
None
See application file for complete search history.

(56) References Cited

U.S. PATENT DOCUMENTS

| | | | | |
|---|---|---|---|---|
| 9,489,354 B1 * | 11/2016 | Lee | ..................... | G06F 21/6245 |
| 2013/0085747 A1 * | 4/2013 | Li | ......................... | G06F 40/242 704/10 |
| 2018/0143956 A1 * | 5/2018 | Skarbovsky | .......... | G06F 40/166 |
| 2019/0005028 A1 * | 1/2019 | Mago | .................. | G06F 16/3344 |
| 2019/0103097 A1 * | 4/2019 | Li | .......................... | G10L 15/197 |
| 2022/0103683 A1 * | 3/2022 | Engelke | ............ | H04M 3/42391 |
| 2022/0147709 A1 | 5/2022 | Hwang et al. | | |

FOREIGN PATENT DOCUMENTS

| | | |
|---|---|---|
| JP | 5688677 B2 | 3/2015 |
| JP | 2022094939 A | 6/2022 |
| KR | 101432761 B1 | 8/2014 |
| KR | 101612629 B1 | 4/2016 |
| KR | 102170844 B1 | 10/2020 |
| KR | 102374405 B1 | 3/2022 |
| KR | 10-2022-0057268 A | 5/2022 |
| KR | 10-2022-0062992 A | 5/2022 |

(Continued)

OTHER PUBLICATIONS

Freitag, "Machine Learning for Information Extraction in Informal Domains" Machine Learning, 39, pp. 169-202, 2000, copyright 2000 Kluwer Academic Publishers. (Year: 2000).*

(Continued)

*Primary Examiner* — Amelia L Tapp
(74) *Attorney, Agent, or Firm* — Seed IP Law Group LLP

(57) ABSTRACT

Disclosed is a method of correcting text information. The method can be performed by a computing device. The method includes obtaining the text information. The method includes determining problem text within the text information. The method includes generating alternative text to correct the problem text by utilizing expanded text associated with the problem text or non-text type information associated with the problem text. The method includes providing information about the alternative text for correcting the problem text.

17 Claims, 7 Drawing Sheets

(56) References Cited

FOREIGN PATENT DOCUMENTS

| KR | 10-2022-0070709 A | 5/2022 |
|----|-------------------|--------|
| KR | 10-2022-0150122 A | 11/2022 |
| KR | 102471790 B1 | 11/2022 |
| KR | 102486119 B1 | 1/2023 |

OTHER PUBLICATIONS

Kukich, "Techniques for Automatically Correcting Words in Text" ACM Computing Surveys, vol. 24, No. 4, Dec. 1992, pp. 377-438. (Year: 1992).*

* cited by examiner

METHOD FOR EDITING TEXT INFORMATION

CROSS-REFERENCE TO RELATED APPLICATIONS

This application claims priority to and the benefit of Korean Patent Application No. 10-2023-0048030 filed in the Korean Intellectual Property Office on Apr. 12, 2023, the entire contents of which are incorporated herein by reference.

BACKGROUND

Technical Field

The present disclosure relates to a method of correcting text information, and more specifically to a technique for correcting text information by generating alternative text to correct problem text.

Description of the Related Art

Speech recognition (Speech To Text (STT), or Automatic Speech Recognition (ASR)) is a dictation technology that changes speech into text. In other words, speech recognition (STT) is a technology for generating text that corresponds to speech. An input to the speech recognition (STT) may include at least one of a speech signal, a spectrogram generated by converting a speech signal, or speech features. Also, an output of the speech recognition (STT) is text in the form of a character string. On the other hand, the speech recognition (STT) model may be implemented in various forms including the neural network model. Further, the speech recognition (STT) model may be divided into a modulated scheme and a non-modulated end-to-end (e2e) scheme depending on the implementation scheme. Here, the modularized scheme may include, but is not limited to, acoustic models (models that represent how speech signals can be represented), linguistic models (models that assign probabilities of occurrence to words based on the given sentences and words), traditional models that perform speech recognition by dividing speech based on a pronunciation dictionary and the like (for example, some ASR models among Kaldi toolkit-based ASR models, and Hybrid-ASR models). On the other hand, the non-modulated approach mainly refers to e2e models (for example, transformer-based encoder decoder models), where the model may be generated by training a lot of data without having submodules. On the other hand, representative decoding technique is beam search technique, which is a method of finding the most optimal answer by considering the entire sentence while opening to various possibilities, rather than just predicting the closest word to the answer in a given context.

On the other hand, the speech recognition (STT) result of transcribing the user's speech is not perfect, it is necessary to perform correction on the resulting text of the speech recognition (STT).

Korean Patent Application Laid-Open No. 10-2022-0070709 (May 31, 2022) discloses a speech recognition error correction modeling method using resulting text and speech features of a speech recognizer.

BRIEF SUMMARY

The present disclosure has been conceived to determine problem text within text information, and generate and provide alternative text to correct the problem text. For example, the present disclosure has been conceived to identify problem text in text information (for example, text resulting from performing speech recognition), generate alternative text that may correct (replace) the problem text by utilizing data search or an artificial intelligence model, and provide alternative text and information about a source of the alternative text in conjunction with each other.

On the other hand, the technical problem to be achieved by the present disclosure is not limited to the technical problem mentioned above, and various technical problems may be included within the range obvious to those skilled in the art from the content to be described below.

An exemplary embodiment of the present disclosure provides a method of correcting text information, the method being performed by a computing device, the method including: obtaining the text information; determining problem text within the text information; generating alternative text to correct the problem text by utilizing expanded text associated with the problem text or non-text type information associated with the problem text; and providing information about the alternative text for correcting the problem text.

In the exemplary embodiment, the providing of the information about the alternative text to correct the problem text may include providing alternative text to correct said problem text together with information about a source of said alternative text.

recognition model; and a partial speech signal corresponding to the problem text in the speech signal input to the speech recognition model.

In the exemplary embodiment, the operation of determining the problem text within the text information may include at least one of: an operation of obtaining input information for the problem text within the text information via the user interface; and an operation of determining text having the lowest confidence in the text information obtained by performing the speech recognition (STT) as the problem text.

In the exemplary embodiment, the operations may further include: an operation of extracting a signal portion corresponding to the alternative text in the speech signal: an operation of generating a pair of the extracted signal portion and the alternative text; and an operation of utilizing said generated pair as training data for a personalized speech recognition model.

In the exemplary embodiment, the operation of providing the information about the alternative text for correcting the problem text may include an operation of providing evaluation information about the alternative text. In the exemplary embodiment, the operation of providing the evaluation information about the alternative text may include at least one of: an operation of performing scoring on the alternative text by using a next sentence prediction model; and an operation of performing scoring on the alternative text by using a text entailment model.

Still another exemplary embodiment of the present disclosure provides a computing device including: at least one processor; and a memory, in which the at least one processor is configured to: obtain the text information; determine problem text within the text information; generate alternative text to correct the problem text by utilizing expanded text associated with the problem text or non-text type information associated with the problem text; and provide information about the alternative text for correcting the problem text.

In the exemplary embodiment, the at least one process may be configured to provide information about the alternative text for correcting the problem text and information about a source of the alternative text together.

In the exemplary embodiment, the expanded text associated with the problem text may include at least one of: text that includes the problem text and is longer than the problem text; a sentence including the problem text; and a paragraph including the problem text.

In the exemplary embodiment, the at least one processor may be configured to: mask a portion of the text that corresponds to the problem text in the expanded text associated with the In the exemplary embodiment, the at least one processor may be configured to perform scoring on the alternative text by using a next sentence prediction model; and perform scoring on the alternative text by using a text entailment model.

According to the present disclosure, by providing alternative text for correcting problem text and information about a source of the alternative text together, it is possible to provide users with reliable information regarding the correction of the problem text and improve user convenience.

Further, the present disclosure may provide information for correcting problem text included in Speech To Text (STT) result text with a high degree of accuracy and confidence. For example, the present disclosure may identify high-accuracy alternative text for correcting the problem text by searching for data utilizing "expanded text associated with the problem text" and "masking techniques," and provide the user with high confidence by providing the identified alternative text along with the source of the search. In another example, the present disclosure may identify high-accuracy alternative text for correcting the problem text by utilizing an additional STT model that is different from the STT model utilized to generate the original STT result text, and may provide high confidence to a user by providing correction information involving multiple STT models. On the other hand, the effect of the present disclosure is not limited to the above-mentioned effects, and various effects may be included within the range apparent to those skilled in the art from the content to be described below.

DETAILED DESCRIPTION

Figure 1:
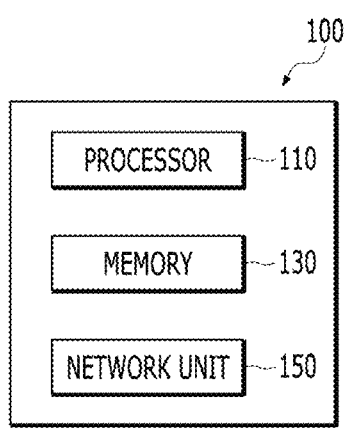
FIG. 1 is a block diagram of a computing device for correcting text information according to an exemplary embodiment of the present disclosure.

Various exemplary embodiments are described with reference to the drawings. In the present specification, various descriptions are presented for understanding the present disclosure. However, it is obvious that the exemplary embodiments may be carried out even without a particular description.

Terms, "component," "module," "system," and the like used in the present specification indicate a computer-related entity, hardware, firmware, software, a combination of software and hardware, or execution of software. For example, a component may be a procedure executed in a processor, a processor, an object, an execution thread, a program, and/or a computer, but is not limited thereto. For example, both an application executed in a computing device and a computing device may be components. One or more components may reside within a processor and/or an execution thread. One component may be localized within one computer. One component may be distributed between two or more computers. Further, the components may be executed by various computer readable media having various data structures stored therein. For example, components may communicate through local and/or remote processing according to a signal (for example, data transmitted to another system through a network, such as the Internet, through data and/or a signal from one component interacting with another component in a local system and a distributed system) having one or more data packets.

Further, a term "or" intends to mean comprehensive "or" not exclusive "or." That is, unless otherwise specified or when it is unclear in context, "X uses A or B" intends to mean one of the natural comprehensive substitutions. That is, in the case where X uses A; X uses B; or, X uses both A and B, "X uses A or B" may apply to either of these cases. Further, a term "and/or" used in the present specification shall be understood to designate and include all of the possible combinations of one or more items among the listed relevant items.

Further, a term "include" and/or "including" shall be understood as meaning that a corresponding characteristic and/or a constituent element exists. Further, it shall be understood that a term "include" and/or "including" means that the existence or an addition of one or more other characteristics, constituent elements, and/or a group thereof is not excluded. Further, unless otherwise specified or when it is unclear that a single form is indicated in context, the singular shall be construed to generally mean "one or more" in the present specification and the claims.

Further, the term "at least one of A and B" should be interpreted to mean "the case including only A," "the case including only B." and "the case where A and B are combined."

Those skilled in the art shall recognize that the various illustrative logical blocks, configurations, modules, circuits, means, logic, and algorithm operations described in relation to the exemplary embodiments additionally disclosed herein may be implemented by electronic hardware, computer software, or in a combination of electronic hardware and computer software. In order to clearly exemplify interchangeability of hardware and software, the various illustrative components, blocks, configurations, means, logic, modules, circuits, and operations have been generally described above in the functional aspects thereof. Whether the functionality is implemented as hardware or software depends on a specific application or design restraints given to the general system. Those skilled in the art may implement the functionality described by various methods for each of the specific applications. However, it shall not be construed that the determinations of the implementation deviate from the range of the contents of the present disclosure.

The description about the presented exemplary embodiments is provided so as for those skilled in the art to use or carry out the present disclosure. Various modifications of the exemplary embodiments will be apparent to those skilled in the art. General principles defined herein may be applied to other exemplary embodiments without departing from the scope of the present disclosure. Therefore, the present disclosure is not limited to the exemplary embodiments presented herein. The present disclosure shall be interpreted within the broadest meaning range consistent to the principles and new characteristics presented herein.

In the present disclosure, a network function and an artificial neural network and a neural network may be interchangeably used.

FIG. 1 is a block diagram of a computing device for modifying textual information according to an exemplary embodiment of the present disclosure.

A configuration of the computing device 100 illustrated in FIG. 1 is only an example shown through simplification. In an exemplary embodiment of the present disclosure, the computing device 100 may include other components for performing a computing configuration of the computing device 100 and only some of the disclosed components may constitute the computing device 100.

The computing device 100 may include a processor 110, a memory 130, and a network unit 150.

The processor 110 may be constituted by one or more cores, and include processors for data analysis and deep learning, such as a central processing unit (CPU), a general purpose graphics processing unit (GPGPU), a tensor processing unit (TPU), etc., of the computing device. The processor 110 may read a computer program stored in the memory 130 and process data for machine learning according to an exemplary embodiment of the present disclosure. According to an exemplary embodiment of the present disclosure, the processor 110 may perform an operation for learning the neural network. The processor 110 may perform calculations for learning the neural network, which include processing of input data for learning in deep learning (DL), extracting a feature in the input data, calculating an error, updating a weight of the neural network using backpropagation, and the like.

At least one of the CPU, the GPGPU, and the TPU of the processor 110 may process learning of the network function. For example, the CPU and the GPGPU may process the learning of the network function and data classification using the network function jointly. In addition, in an exemplary embodiment of the present disclosure, the learning of the network function and the data classification using the network function may be processed by using processors of a plurality of computing devices together. In addition, the computer program performed by the computing device according to an exemplary embodiment of the present disclosure may be a CPU, GPGPU, or TPU executable program.

According to an exemplary embodiment of the present disclosure, the memory 130 may store any type of information generated or determined by the processor 110 and any type of information received by the network unit 150.

According to an exemplary embodiment of the present disclosure, the memory 130 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The computing device 100 may operate in connection with a web storage performing a storing function of the memory 130 on the Internet. The description of the memory is just an example and the present disclosure is not limited thereto.

The network unit 150 according to several embodiments of the present disclosure may use various wired communication systems, such as a Public Switched Telephone Network (PSTN), an x Digital Subscriber Line (xDSL), a Rate Adaptive DSL (RADSL), a Multi Rate DSL (MDSL), a Very High Speed DSL (VDSL), a Universal Asymmetric DSL (UADSL), a High Bit Rate DSL (HDSL), and a local area network (LAN).

The network unit 150 presented in the present specification may use various wireless communication systems, such as Code Division Multi Access (CDMA), Time Division Multi Access (TDMA), Frequency Division Multi Access (FDMA), Orthogonal Frequency Division Multi Access (OFDMA), Single Carrier-FDMA (SC-FDMA), and other systems.

In the present disclosure, the network unit 150 may be configured regardless of a communication aspect, such as wired communication and wireless communication, and may be configured by various communication networks, such as a Personal Area Network (PAN) and a Wide Area Network (WAN). Further, the network may be a publicly known World Wide Web (WWW), and may also use a wireless transmission technology used in short range communication, such as Infrared Data Association (IrDA) or Bluetooth.

In the present disclosure, the network unit (150) can utilize various forms of wired and wireless communication systems.

The technologies described in this specification can be used not only in the mentioned networks but also in other networks.

Figure 2:
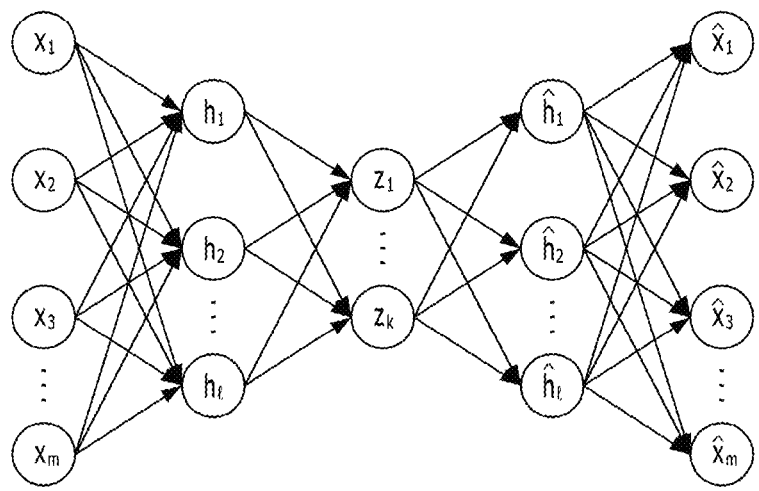
FIG. 2 is a conceptual diagram illustrating a neural network according to the exemplary embodiment of the present disclosure.

FIG. 2 is a schematic diagram illustrating a network function according to the embodiment of the present disclosure.

Throughout the present specification, the meanings of a calculation model, a nerve network, the network function, and the neural network may be interchangeably used. The neural network may be formed of a set of interconnected calculation units which are generally referred to as "nodes." The "nodes" may also be called "neurons." The neural network consists of one or more nodes. The nodes (or neurons) configuring the neural network may be interconnected by one or more links.

In the neural network, one or more nodes connected through the links may relatively form a relationship of an input node and an output node. The concept of the input node is relative to the concept of the output node, and a predetermined node having an output node relationship with respect to one node may have an input node relationship in a relationship with another node, and a reverse relationship is also available. As described above, the relationship between the input node and the output node may be generated based on the link. One or more output nodes may be connected to one input node through a link, and a reverse case may also be valid.

In the relationship between an input node and an output node connected through one link, a value of the output node data may be determined based on data input to the input node. Herein, a link connecting the input node and the output node may have a weight. The weight is variable, and in order for the neural network to perform a desired function, the weight may be varied by a user or an algorithm. For example, when one or more input nodes are connected to one output node by links, respectively, a value of the output node may be determined based on values input to the input nodes connected to the output node and weights set in the link corresponding to each of the input nodes.

As described above, in the neural network, one or more nodes are connected with each other through one or more links to form a relationship of an input node and an output node in the neural network. A characteristic of the neural network may be determined according to the number of nodes and links in the neural network, a correlation between the nodes and the links, and a value of the weight assigned to each of the links. For example, when there are two neural networks in which the numbers of nodes and links are the same and the weight values between the links are different, the two neural networks may be recognized to be different from each other.

The neural network may consist of a set of one or more nodes. A subset of the nodes configuring the neural network may form a layer. Some of the nodes configuring the neural network may form one layer on the basis of distances from an initial input node. For example, a set of nodes having a distance of n from an initial input node may form n layers. The distance from the initial input node may be defined by the minimum number of links, which need to be passed to reach a corresponding node from the initial input node. However, the definition of the layer is arbitrary for the description, and a degree of the layer in the neural network may be defined by a different method from the foregoing method. For example, the layers of the nodes may be defined by a distance from a final output node.

The initial input node may mean one or more nodes to which data is directly input without passing through a link in a relationship with other nodes among the nodes in the neural network. Otherwise, the initial input node may mean nodes which do not have other input nodes connected through the links in a relationship between the nodes based on the link in the neural network. Similarly, the final output node may mean one or more nodes that do not have an output node in a relationship with other nodes among the nodes in the neural network. Further, the hidden node may mean nodes configuring the neural network, not the initial input node and the final output node.

In the neural network according to the embodiment of the present disclosure, the number of nodes of the input layer may be the same as the number of nodes of the output layer, and the neural network may be in the form that the number of nodes decreases and then increases again from the input layer to the hidden layer. Further, in the neural network according to another embodiment of the present disclosure, the number of nodes of the input layer may be smaller than the number of nodes of the output layer, and the neural network may be in the form that the number of nodes decreases from the input layer to the hidden layer. Further, in the neural network according to another embodiment of the present disclosure, the number of nodes of the input layer may be larger than the number of nodes of the output layer, and the neural network may be in the form that the number of nodes increases from the input layer to the hidden layer. The neural network according to another embodiment of the present disclosure may be the neural network in the form in which the foregoing neural networks are combined.

A deep neural network (DNN) may mean the neural network including a plurality of hidden layers, in addition to an input layer and an output layer. When the DNN is used, it is possible to recognize a latent structure of data. That is, it is possible to recognize latent structures of photos, texts, videos, voice, and music (for example, what objects are in the photos, what the content and emotions of the texts are, and what the content and emotions of the voice are). The DNN may include a convolutional neural network (CNN), a recurrent neural network (RNN), an auto encoder, Generative Adversarial Networks (GAN), a Long Short-Term Memory (LSTM), a transformer, a restricted Boltzmann machine (RBM), a deep belief network (DBN), a Q network, a U network, a Siamese network, a Generative Adversarial Network (GAN), and the like. The foregoing description of the deep neural network is merely illustrative, and the present disclosure is not limited thereto.

In the embodiment of the present disclosure, the network function may include an auto encoder. The auto encoder may be one type of artificial neural network for outputting output data similar to input data. The auto encoder may include at least one hidden layer, and the odd-numbered hidden layers may be disposed between the input/output layers. The number of nodes of each layer may decrease from the number of nodes of the input layer to an intermediate layer called a bottleneck layer (encoding), and then be expanded symmetrically with the decrease from the bottleneck layer to the output layer (symmetric with the input layer). The auto encoder may perform a nonlinear dimension reduction. The number of input layers and the number of output layers may correspond to the dimensions after preprocessing of the input data. In the auto encoder structure, the number of nodes of the hidden layer included in the encoder decreases as a distance from the input layer increases. When the number of nodes of the bottleneck layer (the layer having the smallest number of nodes located between the encoder and the decoder) is too small, the sufficient amount of information may not be transmitted, so that the number of nodes of the bottleneck layer may be maintained in a specific number or more (for example, a half or more of the number of nodes of the input layer and the like).

The neural network may be trained by at least one scheme of supervised learning, unsupervised learning, semi-supervised learning, and reinforcement learning. The training of the neural network may be a process of applying knowledge for the neural network to perform a specific operation to the neural network.

The neural network may be trained in a direction of minimizing an error of an output. In the training of the neural network, training data is repeatedly input to the neural network and an error of an output of the neural network for the training data and a target is calculated, and the error of the neural network is back-propagated in a direction from an output layer to an input layer of the neural network in order to decrease the error, and a weight of each node of the neural network is updated. In the case of the supervised learning, training data labelled with a correct answer (that is, labelled training data) is used, in each training data, and in the case of the unsupervised learning, a correct answer may not be labelled to each training data. That is, for example, the training data in the supervised learning for data classification may be data, in which category is labelled to each of the training data. The labelled training data is input to the neural network and the output (category) of the neural network is compared with the label of the training data to calculate an error. For another example, in the case of the unsupervised learning related to the data classification, training data that is the input is compared with an output of the neural network, so that an error may be calculated. The calculated error is back-propagated in a reverse direction (that is, the direction from the output layer to the input layer) in the neural network, and a connection weight of each of the nodes of the layers of the neural network may be updated according to the backpropagation. A change amount of the updated connection weight of each node may be determined according to a learning rate. The calculation of the neural network for the input data and the backpropagation of the error may configure a learning epoch. The learning rate is differently applicable according to the number of times of repetition of the learning epoch of the neural network. For example, at the initial stage of the learning of the neural network, a high learning rate is used to make the neural network rapidly secure performance of a predetermined level and improve efficiency, and at the latter stage of the learning, a low learning rate is used to improve accuracy.

In the training of the neural network, the training data may be generally a subset of actual data (that is, data to be processed by using the trained neural network), and thus an error for the training data is decreased, but there may exist a learning epoch, in which an error for the actual data is increased. Overfitting is a phenomenon, in which the neural network excessively learns training data, so that an error for actual data is increased. For example, a phenomenon, in which the neural network learning a cat while seeing a yellow cat cannot recognize cats, other than a yellow cat, as cats, is a sort of overfitting. Overfitting may act as a reason of increasing an error of a machine learning algorithm. In order to prevent overfitting, various optimizing methods may be used. In order to prevent overfitting, a method of increasing training data, a regularization method, a dropout method of inactivating a part of nodes of the network during the training process, a method using a bath normalization layer, and the like may be applied.

The present disclosure relates to a method of correcting problem text included in text information. Herein, the text information may include various types of text, such as text generated by speech recognition, text generated by user input via an electronic device, text stored in a storage unit, text displayed on a web page, text displayed in an application, text captured by a photographing device, text recognized based on image recognition techniques, and the like. For example, the present disclosure has been conceived to identify problem text in text information based on reference information (for example, confidence in each output text determined by a speech recognition model) or user input, generate alternative text that may correct (replace) the problem text by utilizing data search or an artificial intelligence model, and provide alternative text and information about a source of the alternative text in conjunction with each other. In an exemplary embodiment, in the present disclosure, when a user specifies problem text (for example, a portion including a typo, a word whose meaning is unclear, or a numerical representation in text) in text information, a separate search, investigation, or analysis of the problem text portion is performed to generate alternative text to correct (replace) the problem text, and "a result value to be replaced (alternative text)—a source from which the result value to be replaced was derived" is paired, which is provided to the user in the form of a data pair.

Further, the present disclosure also relates to a technology that "checks the appropriateness of the text" for the user's desired portion of the speech recognition (ASR or STT) result," and is a disclosure related to a kind of data research automation. In particular, it is characterized by conjunction and providing alternative text and the results of the research on alternative text to correct the problem text within the speech recognition (STT) result text with sources. Furthermore, the present disclosure provides a more convenient user experience by performing data research on text selected by a user for text information (for example, speech recognition result text), and providing the user with information about alternative text and source information of the alternative text together as a pair.

In other words, the present disclosure may provide the function to data research and correct text results. Furthermore, the present disclosure is characterized in helping the user to correct the dictation when it is incorrectly transcribed due to speech recognition (STT) performance issues, as well as allowing the user to research data.

Figure 3:
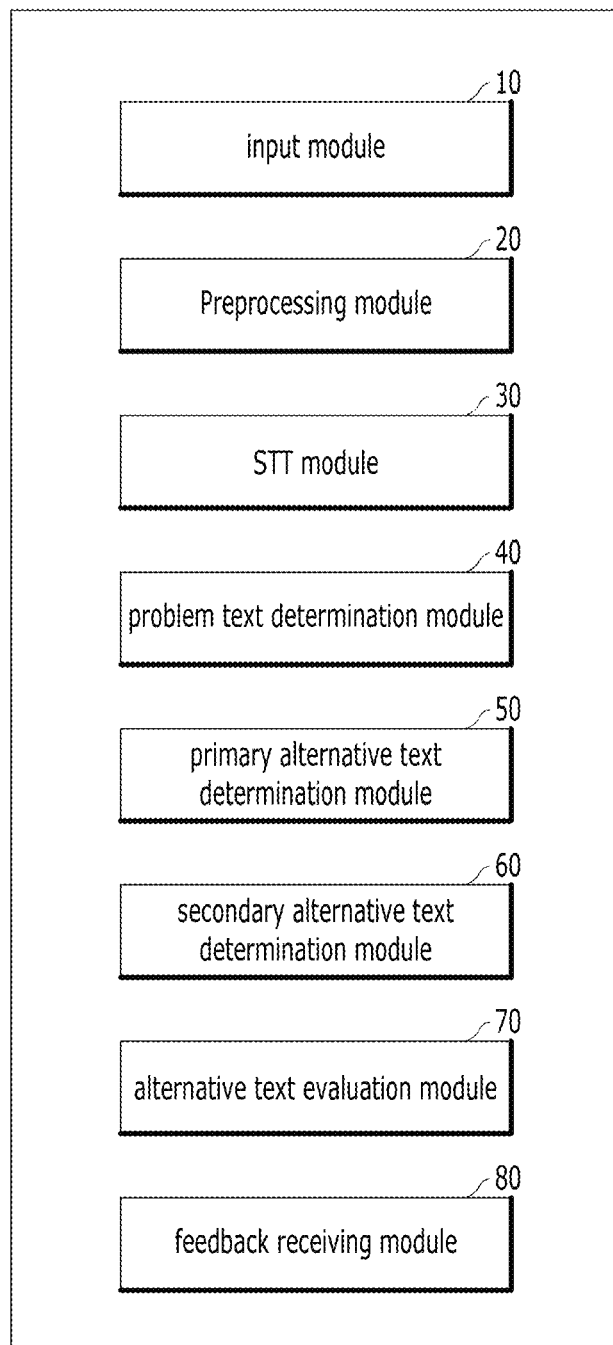
FIG. 3 is a block diagram illustrating a plurality of modules for correcting text information according to the exemplary embodiment of the present disclosure.
Figure 4:
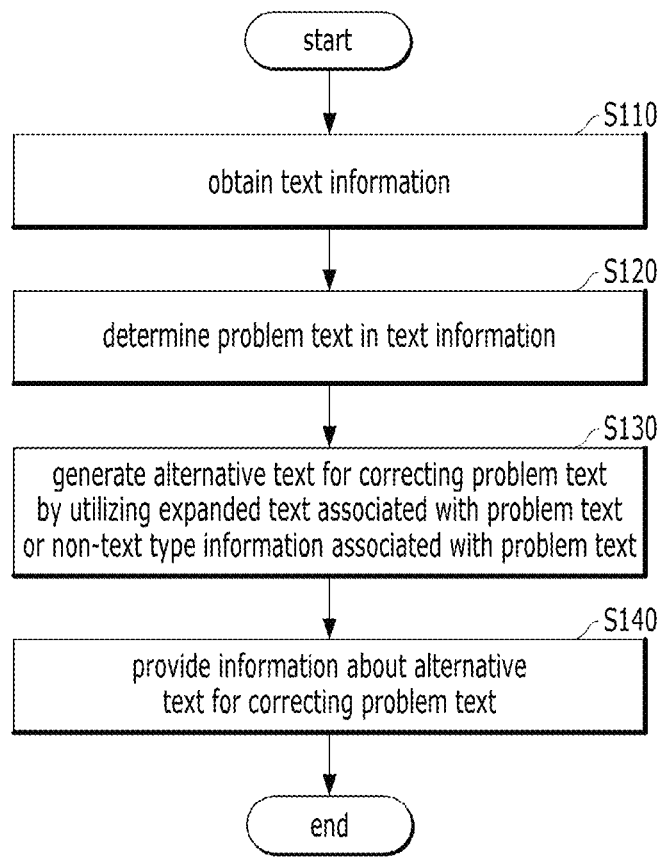
FIG. 4 is a flow diagram illustrating a method of correcting text information according to an exemplary embodiment of the present disclosure.

FIG. 3 is a block diagram illustrating a plurality of modules for correcting text information according to the exemplary embodiment of the present disclosure, and FIG. 4 is a flow diagram illustrating a method of correcting text information according to an exemplary embodiment of the present disclosure.

Exemplarily, referring to FIG. 3, the computing device 100 may include an input module 10, a preprocessing module 20, an STT module 30, a problem text determination module 40, a primary alternative text determination module 50, a secondary alternative text determination module 60, an alternative text evaluation module 70, a feedback receiving module 80, and the like. In the meantime, the plurality of modules that may be included in the computing device 100 may be controlled by the processor 110, or implemented by the operation of the processor 110. Further, the modules that may be included in the computing device 100 for correcting text information are not limited to the plurality of modules described above, and additional modules may be included. An exemplary plurality of modules for correcting text information will be described in more detail below.

Referring to FIG. 4, a method of correcting text information according to an exemplary embodiment of the present disclosure may include: obtaining the text information (S110); determining problem text within the text information (S120); generating alternative text for correcting the problem text by utilizing expanded text associated with the problem text or non-text type information associated with the problem text (S130); and providing information about the alternative text for correcting the problem text (S140). Further, the method of correcting text information according to the exemplary embodiment of the present disclosure may be performed by the computing device 100.

According to the exemplary embodiment of the present disclosure, the computing device 100 may obtain the text information (S110). Herein, the text information may include various types of text, such as text generated by speech recognition, text generated by user input via an electronic device, text stored in a storage unit, text displayed on a web page, text displayed in an application, text captured by a photographing device, text recognized based on image recognition techniques, and the like. For example, the computing device 100 may utilize a speech recognition (speech to text (STT)) model to perform speech recognition (STT) on a speech signal to obtain the text information. For example, the input module 10 included in the computing device 100 may obtain an audio file (for example, a speech signal, a spectrogram generated by converting a speech signal, or speech features) to perform speech recognition (STT). Further, the input module 10 may acquire text information in the unit of a sentence or a paragraph. Further, the preprocessing module 20 included in the computing device 100 may perform preprocessing, such as speech enhancement or Voice Activity Detection (VAD). For example, the VAD is a technique for determining whether voice activity is detected in audio data (for example, audio signals, or audio streams). Before applying the speech recognition (STT), preprocessing techniques, such as VAD, noise removal, and speech enhancement, may be applied. In relation to implementing the VAD, a supervised learning based binary classification algorithm may be utilized, or a distribution based classification algorithm may be utilized. Further, the STT module 30 included in the computing device 100 may perform speech recognition (STT) on the audio file obtained from the input module 10 to generate speech recognition (STT) result text information.

According to the exemplary embodiment, the STT module 30 included in the computing device 100 may perform speech recognition (STT) on the speech signal to obtain the text information. Further, the computing device 100 may also acquire text information (for example, text including a plurality of sentences or paragraphs) that is not the result text information generated by performing speech recognition (STT). However, for ease of description, the present disclosure will be described herein with reference to an exemplary embodiment in which the text information is text information obtained by performing speech recognition (STT) on a speech signal by utilizing the STT module 30.

According to the exemplary embodiment of the present disclosure, the computing device 100 may determine a problem text within text information (S120). In an example, the problem text determination module 40 included in the computing device 100 may determine problem text and mask a portion corresponding to the problem text. For example, the problem text determination module 40 may obtain input information for the problem text within the text information via a user interface. The computing device 100 may provide text information via the user interface, and may obtain user selection (for example, click, or mouse hover) information about text (problem text) that requires additional data supplementation via the user interface. The problem text determination module 40 may also determine the text with the lowest confidence in the text information obtained by performing the speech recognition (STT) as the problem text. Further, the problem text determination module 40 may mask a portion corresponding to the problem text in the expanded text associated with the problem text. For example, the problem text may be masked, and in this case, the masked problem text may not be displayed on the user screen. For reference, alternative text to correct the problem text, which will be described below, may be generated by utilizing the expanded text with the masking applied.

According to the exemplary embodiment, the text information may include the sentence "In 2021, the domestic electric vehicle sales were one hundred thousand sax hundred eighting one units (2021 년 국내 전기차 판매량은 십만육백팔일대 였다)." The problem text determination module 40 may determine "one hundred thousand sax hundred eighting one (십만육백팔일)" as the problem text by i) obtaining input information for the problem text within the text information via a user interface, or ii) determining the text with the lowest confidence in the text information obtained by performing the speech recognition (STT) as the problem text. The problem text determination module 40 may mask the portion corresponding to the problem text "one hundred thousand sax hundred eighting one (십만육백팔일)" in "In 2021, the domestic electric vehicle sales were one hundred thousand sax hundred eighting one units (2021 년 국내 전기차 판매량은 십만육백팔일대 였다)" that is the expanded text associated with the problem text "one hundred thousand sax hundred eighting one (십만육백팔일)." For example, the problem text determination module 40 may mask the "one hundred thousand sax hundred eighting one (십만육백팔일)" corresponding to the problem text, such as "In 2021, the domestic electric vehicle sales were [ ] units (2021 년 국내 전기차 판매량은 []대 였다)." For reference, in the case of numbers, when the STT module 30 performs dictation in Korean, confidence is low, so that the numbers may be determined as the problem text. Alternatively, even when the text information obtained by the STT module 30 is intact (for example, a speech recognition model trained to dictate "one hundred thousand sax hundred eighting one (십만육백팔일)" as one hundred thousand six hundred eighty one (십만육백팔일), or directly as a number, dictates it well as 100681), the numbers may be determined to be problem text because the user has doubts about the authenticity of the corresponding number and selects the numbers for further investigation.

According to the exemplary embodiment of the present disclosure, the computing device 100 may generate alternative text for correcting the problem text by utilizing expanded text associated with the problem text or non-text type information associated with the problem text (S130). Herein, the expanded text associated with the problem text may include at least one of text that includes the problem text and is longer than the problem text, a sentence that includes the problem text, and a paragraph that includes the problem text. Further, the non-text type information associated with the problem text may include at least one of the entirety of the speech signal input to the speech recognition model or a partial speech signal that corresponds to the problem text in the speech signal input to the speech recognition model. For example, when the text information is "In 2021, the domestic electric vehicle sales were one hundred thousand sax hundred eighting one units (2021 년 국내 전기차 판매량은 십만육백팔일대 있다), and the problem text is ""one hundred thousand sax hundred eighting one (십만육백팔일),"" the computing device 100 may generate alternative text to correct the problem text by utilizing at least one of non-text type information associated with the problem text i) the entirety of the speech signal input to the speech recognition model, "In 2021, the domestic electric vehicle sales were one hundred thousand sax hundred eighting one units (2021 년 국내 전기차 판매량은 십만육백팔일대 있다)," or ii) the partial speech signal "one hundred thousand sax hundred eighting one (십만육백팔일)" that corresponds to the problem text in the speech signal input to the speech recognition model.

According to the exemplary embodiment, the primary alternative text determination module 50 included in the computing device 100 may search for the expanded text with the masking applied in a search target domain. In one example, the search target domain may include, but is not limited to, at least one of an application, a program, a website, a search engine, and a digital dictionary. Further, the primary alternative text determination module 50 may provide information about the alternative text and information about the source of the alternative text together as a pair. Here, the source information may include information about the search target domain that was utilized to generate the alternative text.

For example, the primary alternative text determination module 50 may search the expanded text with the masking applied "In 2021, the domestic electric vehicle sales were [ ] units (2021 년 국내 전기차 판매량은 [ ]대 였다 )." in the expanded text "In 2021, the domestic electric vehicle sales were one hundred thousand sax hundred eighting one units (2021 년 국내 전기차) 판매량은 십만육백관쉽일대 였나" associated with the problem text "one hundred thousand sax hundred eighting one (십만육백팔쉽일 )" in the search target domain. Further, the primary alternative text determination module 50 may generate alternative text to correct the problem text based on the result of the search. For example, the primary alternative text determination module 50 may, based on the results of the search, generate "one hundred thousand six hundred eighty one (십만육백팔쉽일 )" or "100681" as alternative text to correct the problem text "one hundred thousand sax hundred eighting one (십만육백팔쉽일 )." Further, the primary alternative text determination module 50 may provide source information of the alternative text (for example, domain information from Google) together as a pair with the information about the alternative text, "one hundred thousand six hundred eighty one (십만육백팔쉽일 )" or "100681."

In other words, the primary alternative text determination module 50 may generate alternative text by preferentially performing data research for the search target domain set by the user in the text result obtained by performing the speech recognition (STT). Further, the primary alternative text determination module 50 may generate alternative text to correct the problem text by searching for the expanded text with the masking applied in the "relevant applications (for example, YouTube), websites, search engines, Wikipedia, and search target domains" set by the user. In one example, the search target domains may be preset by the user. For example, the primary alternative text determination module 50 may obtain input via the user interface in advance to search on Google among the search target domains, and may obtain information about the alternative text for correcting the problem text and information about the source of the alternative text as a pair by searching on Google for the expanded text with the masking applied.

According to the exemplary embodiment of the present disclosure, the secondary alternative text determination module 60 included in the computing device 100 may generate alternative text for correcting the problem text by utilizing additional various types of text generation models in addition to the search results of the primary alternative text determination module 50. For example, the secondary alternative text determination module 60 may generate alternative text for correcting the problem text by using at least one text generation model among ① an additional speech recognition (STT) model, ② a different Language Model (LM), or ③ a Question Answering (QA) model.

First, the secondary alternative text determination module 60 may ① generate alternative text for correcting the problem text based on an additional speech recognition (STT) model. The additional speech recognition (STT) model is a speech recognition (STT) module that is different from the previously described STT module 30. For example, the secondary alternative text determination module 60 may input non-text type information associated with the problem text into an additional speech recognition model that is different from the STT module 30. In other words, the secondary alternative text determination module 60 may input "the entirety of the speech signal" obtained from the input module 10 into an additional speech recognition model that is different from the STT module 30 to generate alternative text for correcting the problem text. Further, the secondary alternative text determination module 60 may extract a portion of the speech signal for the expanded text associated with the problem text. For example, the secondary alternative text determination module 60 may generate alternative text to correct the problem text by inputting "a portion of the speech signal for the expanded text associated with the problem text" into an additional speech recognition model that is different from the STT module 30. In this case, the data input to generate the alternative text may be significantly lighter in size, so that the additional speech recognition model may be implemented in the form of a lighter model, and the computational efficiency may be further improved. For reference, the expanded text associated with the problem text may include at least one of text that includes the problem text and is longer than the problem text, a sentence that includes the problem text, and a paragraph that includes the problem text.

Next, the secondary alternative text determination module 60 may ② generate alternative text for correcting the problem text based on a different language model (LM). For example, the secondary alternative text determination module 60 may extract only the sentence including the problem text. Further, the secondary alternative text determination module 60 may input the sentence including the problem text into another language model (LM) to generate alternative text to correct the problem text. The different language model (LM) may include a Large Language Model (LM), such as ChatGPT.

Next, the secondary alternative text determination module 60 may generate alternative text for correcting the problem text based on a Question Answering (QA) model. For example, the secondary alternative text determination module 60 may generate alternative text for correcting the problem text by inputting the text information generated by performing speech recognition (STT) on the speech signal by the STT module 30, together with the question "What to say in the blank?" into the Question Answering (QA) model. For reference, the blank spaces may correspond to areas that are masked with respect to the problem text.

According to the exemplary embodiment of the present disclosure, the alternative text evaluation module 70 included in the computing device 100 may generate evaluation information for the alternative text for correcting problem text. The alternative text evaluation module 70 may score whether the alternative text searched by the primary alternative text determination module 50 or the alternative text generated by the secondary alternative text determination module 60 is a suitable alternative text for correcting the problem text.

According to the exemplary embodiment, i) the alternative text evaluation module 70 may perform scoring on the alternative text by using a next sentence prediction model. For example, the alternative text evaluation module 70 may input the alternative text (or the expanded alternative text including the alternative text) searched by the primary alternative text determination module 50 and the alternative text (or the expanded alternative text including the alternative text) generated by the secondary alternative text determination module 60, along with the preceding sentence or paragraph or entire text, into the next sentence prediction model to perform scoring. In other words, the alternative text evaluation module 70 may obtain a probability that each candidate alternative text (or each candidate expanded alternative text that includes each candidate alternative text) is predicted after the preceding sentence or paragraph or entire text, and perform scoring based on the corresponding probability.

For example, in the text information "In 2021, the domestic electric vehicle sales were one hundred thousand sax hundred eighting one units (2021 년 국내 전기차 판매량은 서만육백쉬일대 였다 )," when the problem text is "one hundred thousand sax hundred eighting one ( 십만육백쉬일 )," the primary alternative text determination module 50 may determine the alternative text to be "one hundred thousand six hundred eighty one ( 십만육백팔쉬일 )" and ① generate expanded alternative text (for example, a sentence with the alternative text inserted into a masked area), "In 2021, the domestic electric vehicle sales were [one hundred thousand six hundred eighty one] units (2021 년 국내 전기차 판매량은 [서만육백팔쉬일]대 였다 )." Further, the secondary alternative text determination module 60 may determine the alternative text to be "100681" and ② generate expanded alternative text (for example, a sentence with the alternative text inserted into the mask area), "In 2021, the domestic electric vehicle sales were units (2021 년 국내 전기차 판매량은 [1000681]대 였다 )." The alternative text evaluation module 70 may input the generated expanded alternative text ① "In 2021, the domestic electric vehicle sales were [one hundred thousand six hundred eighty one] units (2021 년 국내 전기차 판매량은 ] 십만육백팔십일]대 였다 )." and ② "In 2021, the domestic electric vehicle sales were [100681] units (2021 년 국내 전기차 판매량은 [100681]대 였다 )," along with the preceding sentence or paragraph or the entire text, into the next sentence prediction model to obtain a probability that each candidate expanded alternative text including each candidate alternative text is predicted and perform scoring based on the corresponding probability.

Further, ii) the alternative text evaluation module 70 may also perform scoring on the alternative text by using a text entailment model. For example, the alternative text evaluation module 70 may input the alternative text (or expanded alternative text including the alternative text) searched by the primary alternative text determination module 50 and the alternative text (or expanded alternative text including the alternative text) generated by the secondary alternative text determination module 60, along with the preceding sentence or paragraph or entire text, into the text entailment model to perform scoring. In other words, the alternative text evaluation module 70 may obtain a probability of how suitable each candidate alternative text (or each candidate expanded alternative text including each candidate alternative text) is after the preceding sentence or paragraph, or entire text, and perform scoring based on the corresponding probability.

For example, in the text information "In 2021, the domestic electric vehicle sales were one hundred thousand sax hundred eighting one units (2021 년 국내 전기차 판매량은 서만육백쉬일대 였다 )," when the problem text is "one hundred thousand sax hundred eighting one ( 십만육백쉬일 )," the primary alternative text determination module 50 may determine the alternative text to be "one hundred thousand six hundred eighty one ( 십만육백팔십일 )" and ① generate expanded alternative text (for example, a sentence with the alternative text inserted into a masked area), "In 2021, the domestic electric vehicle sales were [one hundred thousand six hundred eighty one] units (2021 년 국내 전기차 판매량은 [서만육백팔쉬일]대 였다 )." Further, the secondary alternative text determination module 60 may determine the alternative text to be "100681" and ② generate expanded alternative text (for example, a sentence with the alternative text inserted into the mask area), "In 2021, the domestic electric vehicle sales were [1000681] units (2021 년 국내 전기차 판매량은 [1000681] 대 였다 )." The alternative text evaluation module 70 may input the generated expanded alternative text ① "In 2021, the domestic electric vehicle sales were [one hundred thousand six hundred eighty one] units (2021 년 국내 전기차 판매량은 [ 서만육백팔쉬일]대 였다 )." and ② "In 2021, the domestic electric vehicle sales were [1000681] units (2021 년 국내 전기차 판매량은 [[1000681] ]대 였다 )." along with the preceding sentence or paragraph or the entire text, into the text entailment model to obtain a probability of how suitable each candidate expanded alternative text including each candidate alternative text is and perform scoring based on the corresponding probability. However, the scoring for evaluating alternative text is to determine the candidate alternative text to suggest to the user, and may be evaluated in various ways besides the next sentence prediction model or text entailment model described above. For example, alternative text may be evaluated based on ROUGE score, BLEU score, etc., which are popular in natural language processing fields.

According to the exemplary embodiment of the present disclosure, the computing device 100 may provide information about the alternative text for correcting the problem text (S140). For example, the feedback receiving module 80 included in the computing device 100 may provide only information about the alternative text for correcting the problem text. Further, the computing device 100 may provide both information about the alternative text for correcting the problem text and information about a source of the alternative text. For example, the feedback receiving module 80 may provide the alternative text for correcting the problem text together with information about the source of the alternative text (for example, information about the search domain involved in generating the alternative text) when the alternative text for correcting the problem text was searched by the primary alternative text determination module 50. Further, the feedback receiving module 80 may provide the alternative text for correcting the problem text together with information about the source of the alternative text (for example, information about the artificial intelligence model that was involved in generating the alternative text) when the alternative text for correcting the problem text was generated by the secondary alternative text determination module 60.

According to the exemplary embodiment of the present disclosure, the computing device 100 may provide information about the alternative text for correcting the problem text (S140). For example, the feedback receiving module 80 included in the computing device 100 may provide only information about the alternative text for correcting the problem text when the alternative text for correcting the problem text was generated by the secondary alternative text determination module 60. Further, the computing device 100 may provide both information about the alternative text for correcting the problem text and information about a source of the alternative text. For example, the feedback receiving module 80 may provide information about the alternative text for correcting the problem text and the information about a source of the alternative text together when the alternative text for correcting the problem text was searched from the primary alternative text determination module 50.

According to the exemplary embodiment, the feedback receiving module 80 may provide the user interface with evaluation information performed by the alternative text evaluation module 70 on the alternative text searched by the primary alternative text determination module 50 and the alternative text generated by the secondary alternative text determination module 60. On the other hand, the feedback receiving module 80 may first provide the user interface with evaluation information performed by the alternative text evaluation module 70 on the alternative text searched by the primary alternative text determination module 50. For example, i) the feedback receiving module 80 may provide the user interface with a list of the scoring performed by the alternative text evaluation module 70 on the alternative text searched by the primary alternative text determination module 50, along with a guide statement "If there are no desired results in the list, alternative text will be generated and suggested." In this case, the feedback receiving module 80 may provide information about the alternative text searched by the primary alternative text determination module 50 and information about the source of the alternative text (information about the search target domain that was utilized to generate the alternative text) together as a pair. In response, when the user provides feedback via the user interface (for example, by clicking on the "Generate alternative text" UI), and ii) the secondary alternative text determination module 60 may again generate the alternative text to correct the problem text, and the alternative text evaluation module 70 may perform scoring based on the alternative text generated by the secondary alternative text determination module 60, and the feedback receiving module 80 may provide the scored list via the user interface.

According to the exemplary embodiment, the feedback receiving module 80 may provide, via the user interface, the top-ranked alternative text (for example, top five) of those scored by the alternative text evaluation module 70. Further, the feedback receiving module 80 may replace the problem text with the user-selected alternative text based on a user selection input via the user interface. The feedback receiving module 80 may store the alternative text determined based on the user selection in association with the user account, and the pair of the determined alternative text and corresponding speech signal (audio signal) may be associated with the user account and utilized in training a speech recognition model personalized for each user account. According to the exemplary embodiment, the computing device 100 may extract a portion of the speech signal corresponding to the alternative text. Further, the computing device 100 may generate a pair for the extracted signal portion and the alternative text. Furthermore, the computing device 100 may utilize the generated pair as training data for a personalized speech recognition model. That is, the alternative text selected by the user may serve as a ground truth verified accuracy to the problematic speech signal portion (the extracted signal portion), and thus, the pair may be utilized as training data to build a personalized speech recognition model for the user.

In the above description, steps S110 to S140 may be further divided into additional steps, or may be combined into fewer steps, according to the implementation example of the present disclosure. Further, some operations may be omitted as desired, and the order of the operations may be changed.

Figure 5:
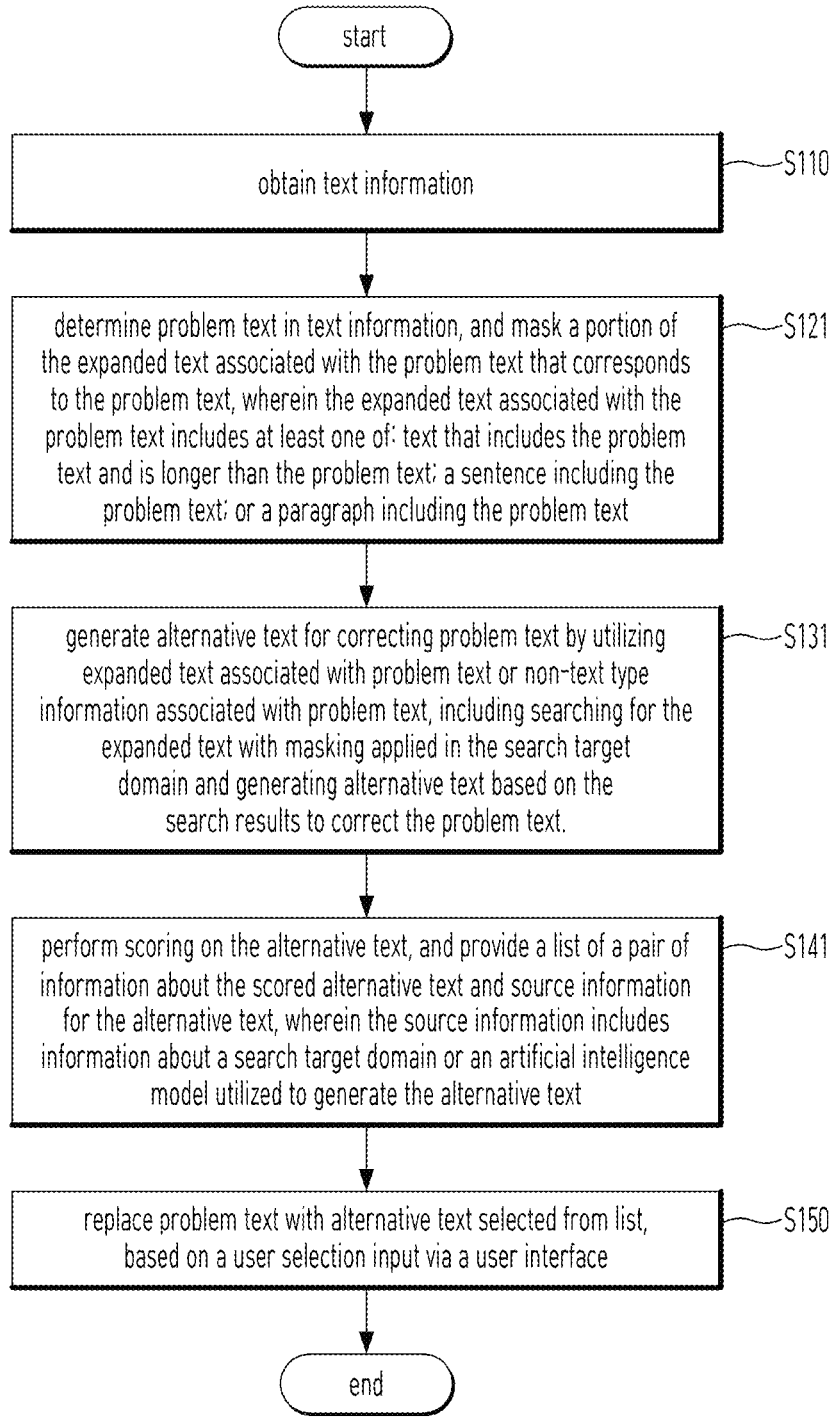
FIG. 5 is the other flow diagram illustrating a method of correcting text information according to an exemplary embodiment of the present disclosure.

Referring to FIG. 5, a method of correcting text information according to an exemplary embodiment of the present disclosure may include: obtaining the text information (S110); determining problem text within the text information (S110), and masking a portion of the expanded text associated with the problem text that corresponds to the problem text, wherein the expanded text associated with the problem text includes at least one of: text that includes the problem text and is longer than the problem text; a sentence including the problem text; or a paragraph including the problem text (S121); generating alternative text for correcting the problem text by utilizing expanded text associated with the problem text or non-text type information associated with the problem text, including searching, in the search target domain, for the expanded text with the masking applied; and generating, based on a result of the search, alternative text to correct the problem text (S131); performing scoring on the alternative text, and providing a list of a pair of information about the scored alternative text and source information for the alternative text (S141); and replacing the problem text with alternative text selected from the list, based on a user selection input via a user interface (S150). Further, the method of correcting text information according to the exemplary embodiment of the present disclosure may be performed by the computing device 100.

Figure 6:
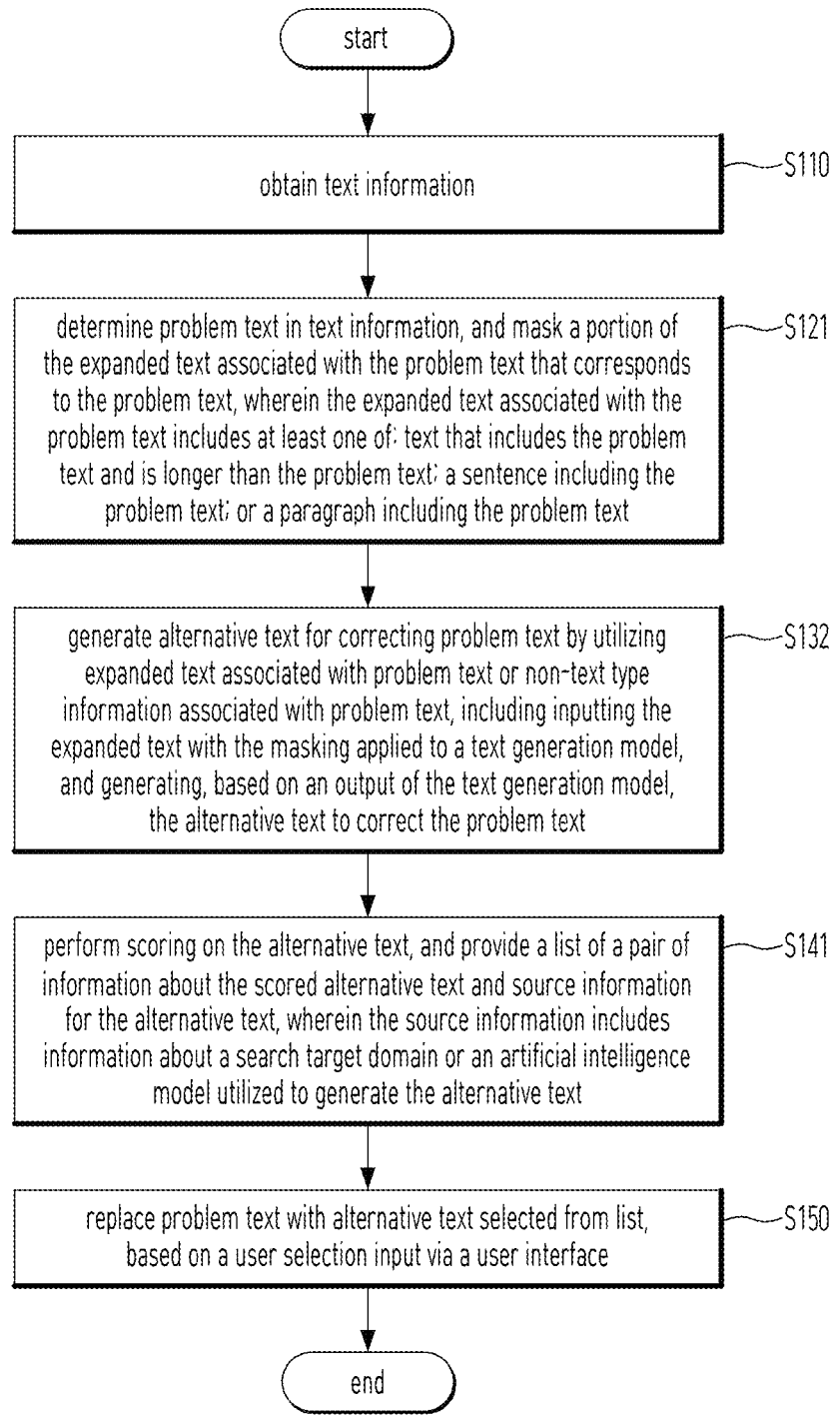
FIG. 6 is another flow diagram illustrating a method of correcting text information according to an exemplary embodiment of the present disclosure.

Referring to FIG. 6, a method of correcting text information according to an exemplary embodiment of the present disclosure may include: obtaining the text information (S110); determining problem text within the text information, and masking a portion of the expanded text associated with the problem text that corresponds to the problem text, wherein the expanded text associated with the problem text includes at least one of: text that includes the problem text and is longer than the problem text; a sentence including the problem text; or a paragraph including the problem text (S121); generating alternative text for correcting the problem text by utilizing expanded text associated with the problem text or non-text type information associated with the problem text, including inputting the expanded text with the masking applied to a text generation model; and generating, based on an output of the text generation model, the alternative text to correct the problem text (S131); performing scoring on the alternative text, and providing a list of a pair of information about the scored alternative text and source information for the alternative text (S141); and replacing the problem text with alternative text selected from the list, based on a user selection input via a user interface (S150). Further, the method of correcting text information according to the exemplary embodiment of the present disclosure may be performed by the computing device 100.

In the above description, steps S110 to S150 may be further divided into additional steps, or may be combined into fewer steps, according to the implementation example of the present disclosure. Further, some operations may be omitted as desired, and the order of the operations may be changed.

In the meantime, according to an embodiment of the present disclosure, a computer readable medium storing a data structure is disclosed.

The data structure may refer to organization, management, and storage of data that enable efficient access and modification of data. The data structure may refer to organization of data for solving a specific problem (for example, data search, data storage, and data modification in the shortest time). The data structure may also be defined with a physical or logical relationship between the data elements designed to support a specific data processing function. A logical relationship between data elements may include a connection relationship between user defined data elements. A physical relationship between data elements may include an actual relationship between the data elements physically stored in a computer readable storage medium (for example, a permanent storage device). In particular, the data structure may include a set of data, a relationship between data, and a function or a command applicable to data. Through the effectively designed data structure, the computing device may perform a calculation while minimally using resources of the computing device. In particular, the computing device may improve efficiency of calculation, reading, insertion, deletion, comparison, exchange, and search through the effectively designed data structure.

The data structure may be divided into a linear data structure and a non-linear data structure according to the form of the data structure. The linear data structure may be the structure in which only one data is connected after one data. The linear data structure may include a list, a stack, a queue, and a deque. The list may mean a series of dataset in which order exists internally. The list may include a linked list. The linked list may have a data structure in which data is connected in a method in which each data has a pointer and is linked in a single line. In the linked list, the pointer may include information about the connection with the next or previous data. The linked list may be expressed as a single linked list, a double linked list, and a circular linked list according to the form. The stack may have a data listing structure with limited access to data. The stack may have a linear data structure that may process (for example, insert or delete) data only at one end of the data structure. The data stored in the stack may have a data structure (Last In First Out, LIFO) in which the later the data enters, the sooner the data comes out. The queue is a data listing structure with limited access to data, and may have a data structure (First In First Out, FIFO) in which the later the data is stored, the later the data comes out, unlike the stack. The deque may have a data structure that may process data at both ends of the data structure.

The non-linear data structure may be the structure in which the plurality of data is connected after one data. The non-linear data structure may include a graph data structure. The graph data structure may be defined with a vertex and an edge, and the edge may include a line connecting two different vertexes. The graph data structure may include a tree data structure. The tree data structure may be the data structure in which a path connecting two different vertexes among the plurality of vertexes included in the tree is one. That is, the tree data structure may be the data structure in which a loop is not formed in the graph data structure.

Throughout the present specification, a calculation model, a nerve network, the network function, and the neural network may be used with the same meaning. Hereinafter, the terms of the calculation model, the nerve network, the network function, and the neural network are unified and described with a neural network. The data structure may include a neural network. Further, the data structure including the neural network may be stored in a computer readable medium. The data structure including the neural network may also include preprocessed data for processing by the neural network, data input to the neural network, a weight of the neural network, a hyper-parameter of the neural network, data obtained from the neural network, an active function associated with each node or layer of the neural network, and a loss function for training of the neural network. The data structure including the neural network may include predetermined configuration elements among the disclosed configurations. That is, the data structure including the neural network may include the entirety or a predetermined combination of pre-processed data for processing by neural network, data input to the neural network, a weight of the neural network, a hyper parameter of the neural network, data obtained from the neural network, an active function associated with each node or layer of the neural network, and a loss function for training the neural network. In addition to the foregoing configurations, the data structure including the neural network may include predetermined other information determining a characteristic of the neural network. Further, the data structure may include all type of data used or generated in a computation process of the neural network, and is not limited to the foregoing matter. The computer readable medium may include a computer readable recording medium and/or a computer readable transmission medium. The neural network may be formed of a set of interconnected calculation units which are generally referred to as "nodes." The "nodes" may also be called "neurons." The neural network consists of one or more nodes.

The data structure may include data input to the neural network. The data structure including the data input to the neural network may be stored in the computer readable medium. The data input to the neural network may include training data input in the training process of the neural network and/or input data input to the training completed neural network. The data input to the neural network may include data that has undergone pre-processing and/or data to be pre-processed. The pre-processing may include a data processing process for inputting data to the neural network. Accordingly, the data structure may include data to be pre-processed and data generated by the pre-processing. The foregoing data structure is merely an example, and the present disclosure is not limited thereto.

The data structure may include a weight of the neural network (in the present specification, weights and parameters may be used with the same meaning), Further, the data structure including the weight of the neural network may be stored in the computer readable medium. The neural network may include a plurality of weights. The weight is variable, and in order for the neural network to perform a desired function, the weight may be varied by a user or an algorithm. For example, when one or more input nodes are connected to one output node by links, respectively, the output node may determine a data value output from the output node based on values input to the input nodes connected to the output node and the weight set in the link corresponding to each of the input nodes. The foregoing data structure is merely an example, and the present disclosure is not limited thereto.

For a non-limited example, the weight may include a weight varied in the neural network training process and/or the weight when the training of the neural network is completed. The weight varied in the neural network training process may include a weight at a time at which a training cycle starts and/or a weight varied during a training cycle. The weight when the training of the neural network is completed may include a weight of the neural network completing the training cycle. Accordingly, the data structure including the weight of the neural network may include the data structure including the weight varied in the neural network training process and/or the weight when the training of the neural network is completed. Accordingly, it is assumed that the weight and/or a combination of the respective weights are included in the data structure including the weight of the neural network. The foregoing data structure is merely an example, and the present disclosure is not limited thereto.

The data structure including the weight of the neural network may be stored in the computer readable storage medium (for example, a memory and a hard disk) after undergoing a serialization process. The serialization may be the process of storing the data structure in the same or different computing devices and converting the data structure into a form that may be reconstructed and used later. The computing device may serialize the data structure and transceive the data through a network. The serialized data structure including the weight of the neural network may be reconstructed in the same or different computing devices through deserialization. The data structure including the weight of the neural network is not limited to the serialization. Further, the data structure including the weight of the neural network may include a data structure (for example, in the non-linear data structure, B-Tree, Trie, m-way search tree, AVL tree, and Red-Black Tree) for improving efficiency of the calculation while minimally using the resources of the computing device. The foregoing matter is merely an example, and the present disclosure is not limited thereto.

The data structure may include a hyper-parameter of the neural network. The data structure including the hyper-parameter of the neural network may be stored in the computer readable medium. The hyper-parameter may be a variable varied by a user. The hyper-parameter may include, for example, a learning rate, a cost function, the number of times of repetition of the training cycle, weight initialization (for example, setting of a range of a weight value to be weight-initialized), and the number of hidden units (for example, the number of hidden layers and the number of nodes of the hidden layer). The foregoing data structure is merely an example, and the present disclosure is not limited thereto.

Figure 7:
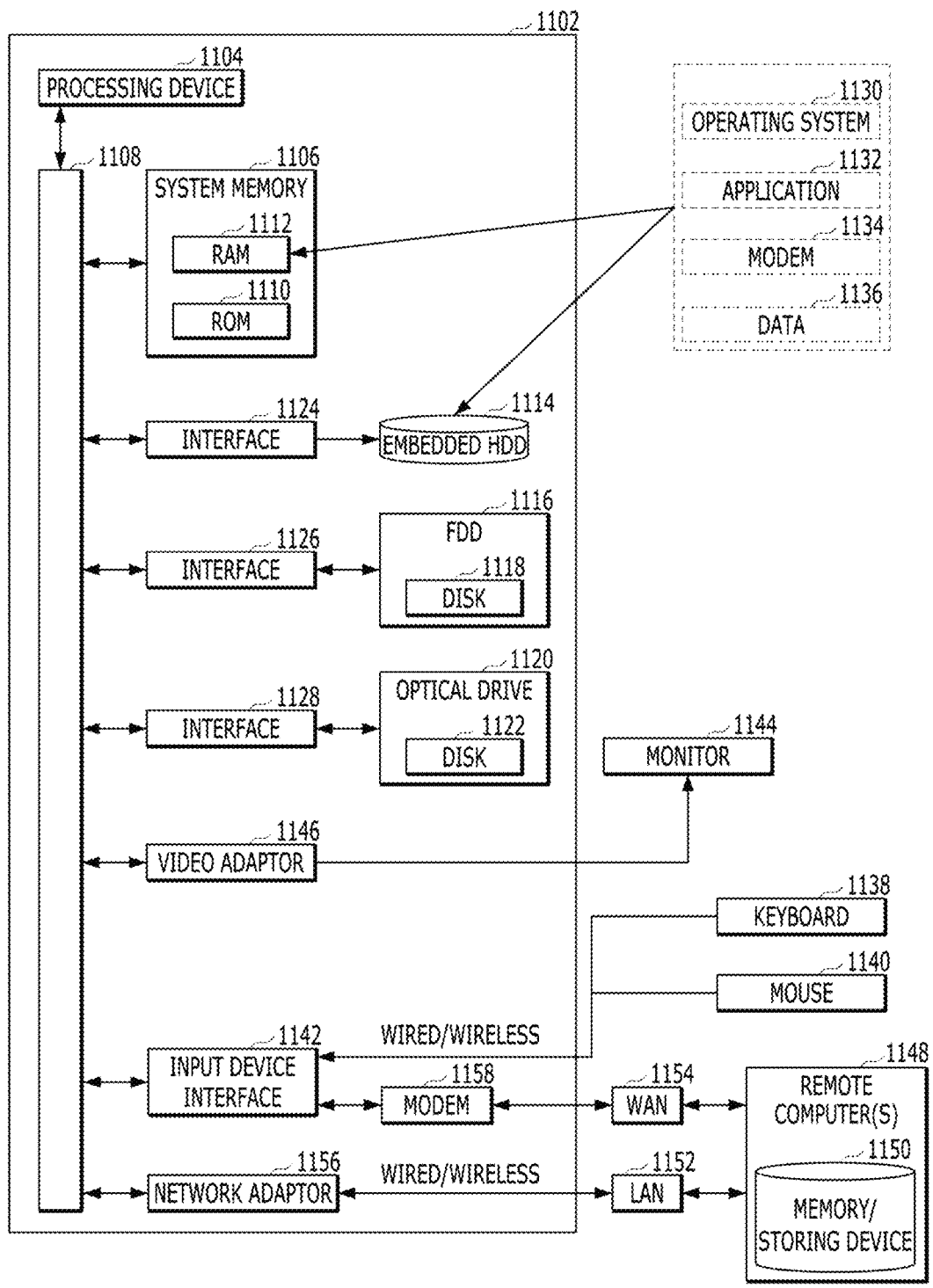
FIG. 7 is a brief and general schematic diagram of an exemplary computing environment in which exemplary embodiments of the present disclosure may be implemented.

FIG. 7 is a simple and general schematic diagram illustrating an example of a computing environment in which the embodiments of the present disclosure are implementable.

The present disclosure has been described as being generally implementable by the computing device, but those skilled in the art will appreciate well that the present disclosure is combined with computer executable commands and/or other program modules executable in one or more computers and/or be implemented by a combination of hardware and software.

In general, a program module includes a routine, a program, a component, a data structure, and the like performing a specific task or implementing a specific abstract data form. Further, those skilled in the art will well appreciate that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The embodiments of the present disclosure may be carried out in a distribution computing environment, in which certain tasks are performed by remote processing devices connected through a communication network. In the distribution computing environment, a program module may be located in both a local memory storage device and a remote memory storage device.

The computer generally includes various computer readable media. The computer accessible medium may be any type of computer readable medium, and the computer readable medium includes volatile and non-volatile media, transitory and non-transitory media, and portable and non-portable media. As a non-limited example, the computer readable medium may include a computer readable storage medium and a computer readable transport medium. The computer readable storage medium includes volatile and non-volatile media, transitory and non-transitory media, and portable and non-portable media constructed by a predetermined method or technology, which stores information, such as a computer readable command, a data structure, a program module, or other data. The computer readable storage medium includes a RAM, a Read Only Memory (ROM), an Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally implements a computer readable command, a data structure, a program module, or other data in a modulated data signal, such as a carrier wave or other transport mechanisms, and includes all of the information transport media. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, Radio Frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited) to the processing device 1104. The processing device 1104 may be a predetermined processor among various commonly used processors. A dual processor and other multi-processor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an EPROM, and an EEPROM, and the BIOS includes a basic routing helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 being configured for exterior mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an outer mounted drive includes, for example, at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of random data in an appropriate digital form. In the description of the computer readable media, the HDD, the portable magnetic disk, and the portable optical media, such as a CD, or a DVD, are mentioned, but those skilled in the art will well appreciate that other types of computer readable media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be well appreciated that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adaptor 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a work station, a computing device computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, the Internet.

When the computer 1102 is used in the LAN networking environment, the computer 1102 is connected to the local network 1152 through a wired and/or wireless communication network interface or an adaptor 1156. The adaptor 1156 may make wired or wireless communication to the LAN 1152 easy, and the LAN 1152 also includes a wireless access point installed therein for the communication with the wireless adaptor 1156. When the computer 1102 is used in the WAN networking environment, the computer 1102 may include a modem 1158, is connected to a communication computing device on a WAN 1154, or includes other means setting communication through the WAN 1154 via the Internet. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art may appreciate that information and signals may be expressed by using predetermined various different technologies and techniques. For example, data, indications, commands, information, signals, bits, symbols, and chips referable in the foregoing description may be expressed with voltages, currents, electromagnetic waves, magnetic fields or particles, optical fields or particles, or a predetermined combination thereof.

Those skilled in the art will appreciate that the various illustrative logical blocks, modules, processors, means, circuits, and algorithm operations described in relationship to the embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various embodiments presented herein may be implemented by a method, a device, or a manufactured article using a standard programming and/or engineering technology. A term "manufactured article" includes a computer program, a carrier, or a medium accessible from a predetermined computer-readable storage device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be rearranged within the scope of the present disclosure based on design priorities. The accompanying method claims provide various operations of elements in a sample order, but it does not mean that the claims are limited to the presented specific order or hierarchical structure.

The description of the presented embodiments is provided so as for those skilled in the art to use or carry out the present disclosure. Various modifications of the embodiments may be apparent to those skilled in the art, and general principles defined herein may be applied to other embodiments without departing from the scope of the present disclosure. Accordingly, the present disclosure is not limited to the embodiments suggested herein, and shall be interpreted within the broadest meaning range consistent to the principles and new characteristics presented herein.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of correcting text information performed by a computing device, the method comprising:
   obtaining the text information;
   determining problem text within the text information;
   generating alternative text to correct the problem text by utilizing expanded text associated with the problem text or non-text type information associated with the problem text;
   performing scoring on the alternative text, and providing a list of a pair of information about the scored alternative text and source information for the alternative text; and
   replacing the problem text with alternative text selected from the list, based on a user selection input via a user interface,
   wherein the source information includes information about a search target domain or an artificial intelligence model utilized to generate the alternative text,
   wherein the expanded text associated with the problem text includes at least one of:
      text that includes the problem text and is longer than the problem text;
      a sentence including the problem text; or
      a paragraph including the problem text,
   wherein the determining of the problem text within the text information includes
      masking a portion of the expanded text associated with the problem text that corresponds to the problem text, and
      the generating of the alternative text to correct the problem text includes
         searching, in the search target domain, for the expanded text with the masking applied; and
         generating, based on a result of the search, alternative text to correct the problem text.

2. The method of claim 1, wherein the search target domain includes at least one of an application, a program, a website, a search engine, or a digital dictionary.

3. The method of claim 1, wherein the obtaining of the text information includes obtaining the text information by performing speech recognition (Speech To Text (STT)) on a speech signal by utilizing a speech recognition (STT) model.

4. The method of claim 3, wherein the generating of the alternative text to correct the problem text further includes:
   inputting non-text type information associated with the problem text to an additional speech recognition model that is different from the speech recognition model; and
   generating, based on an output of the additional speech recognition model, the alternative text to correct the problem text.

5. The method of claim 4, wherein the non-text type information associated with the problem text includes at least one of:
   entirety of the speech signal input to the speech recognition model; or
   a partial speech signal corresponding to the problem text in the speech signal input to the speech recognition model.

6. The method of claim 3, wherein the determining of the problem text within the text information includes at least one of:
   obtaining input information for the problem text within the text information via the user interface; or
   determining text having a lowest confidence in the text information obtained by performing the speech recognition (STT) as the problem text.

7. The method of claim 3, further comprising:
   extracting a signal portion of the speech signal corresponding to the alternative text;
   generating a pair of the extracted signal portion and the alternative text; and
   utilizing the generated pair as training data for a personalized speech recognition model.

8. The method of claim 1, wherein the performing of the scoring on the alternative text includes at least one of:

performing scoring on the alternative text by using a next sentence prediction model; or performing scoring on the alternative text by using a text entailment model.

9. A computer program stored in a non-transitory computer readable storage medium, wherein when the computer program is executed by one or more processors, the computer program causes the at least one processor to perform following operations for correcting text information, the operations comprising:
   an operation of obtaining the text information;
   an operation of determining problem text within the text information;
   an operation of generating alternative text to correct the problem text by utilizing expanded text associated with the problem text or non-text type information associated with the problem text;
   an operation of performing scoring on the alternative text, and providing a list of a pair of information about the scored alternative text and source information for the alternative text; and
   an operation of replacing the problem text with alternative text selected from the list, based on a user selection input via a user interface,
   wherein the source information includes information about a search target domain or an artificial intelligence model utilized to generate the alternative text,
   wherein the expanded text associated with the problem text includes at least one of:
      text that includes the problem text and is longer than the problem text;
      a sentence including the problem text; or
      a paragraph including the problem text,
   wherein the determining of the problem text within the text information includes masking a portion of the expanded text associated with the problem text that corresponds to the problem text, and
   the generating of the alternative text to correct the problem text includes:
      an operation of inputting the expanded text with the masking applied to a text generation model; and
      an operation of generating, based on an output of the text generation model, the alternative text to correct the problem text.

10. The computer program of claim 9, wherein the operation of obtaining the text information includes an operation of obtaining the text information by performing speech recognition (Speech To Text (STT)) on a speech signal by utilizing a speech recognition (STT) model.

11. The computer program of claim 9, wherein the operation of performing the scoring on the alternative text includes at least one of:
   an operation of performing scoring on the alternative text by using a next sentence prediction model; or
   an operation of performing scoring on the alternative text by using a text entailment model.

12. A computing device, comprising:
   at least one processor; and
   a memory,
   wherein the at least one processor is configured to:
      obtain the text information;
      determine problem text within the text information;
      generate alternative text to correct the problem text by utilizing expanded text associated with the problem text or non-text type information associated with the problem text;
      perform scoring on the alternative text, and providing a list of a pair of information about the scored alternative text and source information for the alternative text; and
      replace the problem text with the alternative text selected from the list, based on a user selection input via a user interface,
   wherein the source information includes information about a search target domain or an artificial intelligence model utilized to generate the alternative text,
   wherein the expanded text associated with the problem text includes at least one of:
      text that includes the problem text and is longer than the problem text,
      a sentence including the problem text; or
      a paragraph including the problem text,
   wherein the at least one processor is further configured to:
      mask a portion of the expanded text associated with the above problem text that corresponds to the problem text;
      input the expanded text with the masking applied to a text generation model; and
      generate based on an output of the text generation model, the alternative text to correct the problem text.

13. The computing device of claim 12, wherein the at least one processor is further configured to obtain the text information by performing speech recognition (Speech To Text (STT)) on a speech signal by utilizing a speech recognition (STT) model.

14. The computing device of claim 13, wherein the at least one processor is further configured to:
   input non-text type information associated with the problem text to an additional speech recognition model that is different from the speech recognition model; and
   generate, based on an output of the additional speech recognition model, the alternative text to correct the problem text.

15. The computing device of claim 13, wherein the at least one processor is further configured to:
   obtain input information for the problem text within the text information via the user interface; and
   determine text having a lowest confidence in the text information obtained by performing the speech recognition (STT) as the problem text.

16. The computing device of claim 13, wherein the at least one processor is further configured to:
   extract a signal portion of the speech signal corresponding to the alternative text;
   generate a pair of the extracted signal portion and the alternative text; and
   utilize the generated pair as training data for a personalized speech recognition model.

17. The computing device of claim 12, wherein the at least one processor is configured to:
   perform scoring on the alternative text by using a next sentence prediction model; and
   perform scoring on the alternative text by using a text entailment model.

* * * * *